United States Patent
Wu et al.

(10) Patent No.: US 10,511,423 B2
(45) Date of Patent: Dec. 17, 2019

(54) DATA TRANSMISSION METHOD, TERMINAL DEVICE, AND BASE STATION

(71) Applicant: HUAWEI TECHNOLOGIES CO., LTD., Shenzhen, Guangdong (CN)

(72) Inventors: Qiang Wu, Beijing (CN); Bingyu Qu, Beijing (CN); Lixia Xue, Shenzhen (CN); Hao Sun, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/923,946

(22) Filed: Mar. 16, 2018

(65) Prior Publication Data
US 2018/0205515 A1    Jul. 19, 2018

Related U.S. Application Data

(63) Continuation of application No. PCT/CN2015/089803, filed on Sep. 16, 2015.

(51) Int. Cl.
*H04L 5/00*    (2006.01)
*H04W 72/04*    (2009.01)
(Continued)

(52) U.S. Cl.
CPC .......... *H04L 5/0048* (2013.01); *H04J 11/005* (2013.01); *H04L 5/006* (2013.01);
(Continued)

(58) Field of Classification Search
None
See application file for complete search history.

(56) References Cited

U.S. PATENT DOCUMENTS

| 2010/0182898 A1 | 7/2010 | Li et al. |
| 2011/0128909 A1* | 6/2011 | Luo .................. H04L 5/0023 370/328 |

(Continued)

FOREIGN PATENT DOCUMENTS

| CN | 101309134 A | 11/2008 |
| CN | 101854227 A | 10/2010 |

(Continued)

OTHER PUBLICATIONS

XP050553947 3GPP TS 36.211 V10.3.0 (Technical Specification), 3rd Generation Partnership Project;Technical Specification Group Radio Access Network; Evolved Universal Terrestrial Radio Access (E-UTRA); Physical Channels and Modulation (Release 10) (Sep. 2011), total 103 pages.

*Primary Examiner* — Hong S Cho
(74) *Attorney, Agent, or Firm* — Womble Bond Dickinson (US) LLP (57) ABSTRACT

A data transmission method, a terminal device, and a base station are described. The data transmission method determines, by a terminal device, a first reference signal (RS) sequence corresponding to a first time interval, where the first RS sequence is one of N RS sequences, N is a positive integer greater than 1, and the N RS sequences are generated based on at least two root sequences, sends, by the terminal device, the first RS sequence to a base station in the first time interval, determines, by the terminal device from the N RS sequences according to the first RS sequence, one RS sequence as a second RS sequence corresponding to a second time interval, where the second RS sequence is determined according to the first RS sequence, and sends the second RS sequence to the base station in the second time interval.

20 Claims, 6 Drawing Sheets

(51) Int. Cl.
*H04L 13/00* (2006.01)
*H04W 74/08* (2009.01)
*H04L 27/26* (2006.01)
*H04J 11/00* (2006.01)
*H04W 88/08* (2009.01)
*H04J 13/00* (2011.01)

(52) U.S. Cl.
CPC .......... *H04L 5/0051* (2013.01); *H04L 27/261* (2013.01); *H04W 72/04* (2013.01); *H04W 72/044* (2013.01); *H04W 74/08* (2013.01); *H04J 13/0062* (2013.01); *H04W 88/08* (2013.01)

(56) References Cited

U.S. PATENT DOCUMENTS

| | | | |
|---|---|---|---|
| 2011/0141982 A1* | 6/2011 | Zhang | H04J 13/0062 370/329 |
| 2011/0228737 A1* | 9/2011 | Lee | H04B 7/0671 370/329 |
| 2013/0170441 A1 | 7/2013 | Sorrentino | |
| 2014/0192756 A1 | 7/2014 | Baldemair et al. | |
| 2014/0301345 A1* | 10/2014 | Kim | H04L 5/0053 370/329 |

FOREIGN PATENT DOCUMENTS

| | | |
|---|---|---|
| CN | 102461052 A | 5/2012 |
| EP | 2624495 A1 | 8/2013 |
| WO | 2011005163 A1 | 1/2011 |

* cited by examiner

FIG. 9

DATA TRANSMISSION METHOD, TERMINAL DEVICE, AND BASE STATION

CROSS-REFERENCE TO RELATED APPLICATION

This application is a continuation of International Application No. PCT/CN2015/089803, filed on Sep. 16, 2015, the disclosure of which is hereby incorporated by reference in its entirety.

TECHNICAL FIELD

This disclosure relates to the wireless communications field, and more specifically, to a data transmission method, a terminal device, and a base station.

BACKGROUND

In a 3rd Generation Partnership Project (3GPP) Long Term Evolution (LTE)/LTE-Advanced (LTE-A) system, an orthogonal frequency division multiple access (OFDMA) manner is generally used as a downlink multiple access manner. A downlink resource of the system is divided into subframes in a time domain, and is divided into subcarriers in a frequency domain. In a current LTE system, duration of one subframe is 1 millisecond (ms), and each subframe is further divided into two slots (slot) of 0.5 ms. For a normal cyclic prefix (normal CP), each slot consists of seven orthogonal frequency division multiplexing (OFDM) symbols. For an extended cyclic prefix (extended CP), each slot consists of six OFDM symbols. The OFDM symbol is hereinafter referred to as a symbol.

Generally, a base station may perform uplink channel estimation by using a reference signal such as a demodulation reference signal (DMRS). The DMRS exists on a physical uplink shared channel (PUSCH) and a physical uplink control channel (PUCCH). A time domain location of the DMRS on the PUSCH is the fourth symbol, from the bottom, of each slot, and a frequency domain location is consistent with bandwidth allocated to a user. A location on the PUCCH varies with a PUCCH transmission format.

Figure 1:
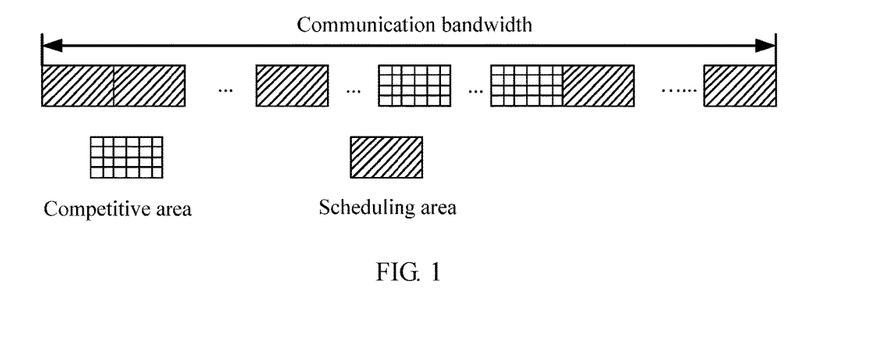
FIG. 1 is a schematic diagram of a competitive transmission mode.

In future communication, there is a quite high requirement for a quantity of user connections, and frequently sending a small data packet poses a challenge to a control channel capacity. As shown in FIG. 1, in order to reduce resources occupied by control signaling, system bandwidth/frequency domain resources are divided into two parts. One part is a scheduling area, and the other part is a competitive data transmission area without control channel scheduling. Using an uplink PUSCH as an example, a base station designates some terminal devices to send control signaling in the competitive transmission area, and the base station receives data by means of blind detection.

Because there is no indication of the control signaling in the competitive data transmission area, the terminal device can be associated only with a DMRS. If DMRSs associated with two terminal devices are the same and sent at the same time, the base station cannot correctly obtain channels of the two terminal devices by using the DMRSs. This causes a severe decrease in detection performance.

An uplink DMRS pilot sequence in an existing LTE system is a Zadoff-Chu sequence. A plurality of DMRS sequences are generated by using different shifts of one root sequence, and each DMRS sequence corresponds to one terminal device in one time interval. In the existing system, to ensure orthogonality between different uplink DMRS sequences, a maximum of eight shifts are used in the Zadoff-Chu sequence. That is, in an existing communication mechanism, a maximum of eight users can be allowed to send uplink data in the competitive data transmission area in a same time interval. This is far from meeting a requirement for the connections of a plurality of users.

SUMMARY

Embodiments of the present invention provide a data transmission method, a terminal device, and a base station, so as to resolve a problem that only a limited quantity of users can send uplink data by using an existing communication mechanism.

A first aspect of an embodiment of the present invention provides a data transmission method, including: determining, by a terminal device, a first reference signal (RS) sequence corresponding to a first time interval, where the first RS sequence is one of N RS sequences, N is a positive integer greater than 1, and the N RS sequences are generated based on at least two root sequences; sending, by the terminal device, the first RS sequence to a base station in the first time interval; determining, by the terminal device from the N RS sequences according to the first RS sequence, one RS sequence as a second RS sequence corresponding to a second time interval, where the second RS sequence is determined according to the first RS sequence; and sending, by the terminal device, the second RS sequence to the base station in the second time interval.

A second aspect of an embodiment of the present invention provides a data transmission method, including: receiving, by a base station, a first reference signal (RS) sequence in a first time interval, where the first RS sequence is one of N RS sequences, N is a positive integer, and the N RS sequences are generated based on at least two root sequences; determining, by the base station according to the first time interval, that the received first RS sequence is sent by a first terminal device; receiving, by the base station, a second RS sequence in a second time interval, where the second RS sequence is one of the N RS sequences, and the second RS sequence is determined according to the first RS sequence; and determining, by the base station according to the second time interval, that the received second RS sequence is sent by the first terminal device.

A third aspect of an embodiment of the present invention provides a terminal device, including: a processing unit, configured to determine a first reference signal (RS) sequence corresponding to a first time interval, where the first RS sequence is one of N RS sequences, N is a positive integer greater than 1, and the N RS sequences are generated based on at least two root sequences; and a sending unit, configured to send the first RS sequence to a base station in the first time interval, where the processing unit is further configured to determine, from the N RS sequences according to the first RS sequence, one RS sequence as a second RS sequence corresponding to a second time interval, where the second RS sequence is determined according to the first RS sequence; and the sending unit is further configured to send the second RS sequence to the base station in the second time interval.

A fourth aspect of an embodiment of the present invention provides a base station, including: a receiving unit, configured to receive a first reference signal (RS) sequence in a first time interval, where the first RS sequence is one of N RS sequences, N is a positive integer, and the N RS sequences are generated based on at least two root sequences; and a processing unit, configured to determine, according to the first time interval, that the received first RS sequence is sent by a first terminal device, where the receiving unit is further configured to receive a second RS sequence in a second time interval, where the second RS sequence is one of the N RS sequences, and the second RS sequence is determined according to the first RS sequence; and the processing unit is further configured to determine, according to the second time interval, that the received second RS sequence is sent by the first terminal device.

In the embodiments of the present invention, a plurality of RS sequences based on different root sequences are introduced, so that a requirement for connections of a plurality of users is met.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the embodiments of the present invention.

The technical solutions of the embodiments of the present invention may be applied to various communications systems, such as a GSM system, a Code Division Multiple Access (CDMA) system, a Wideband Code Division Multiple Access (WCDMA) system, a general packet radio service (GPRS) system, and a Long Term Evolution (LTE) system.

Figure 2:
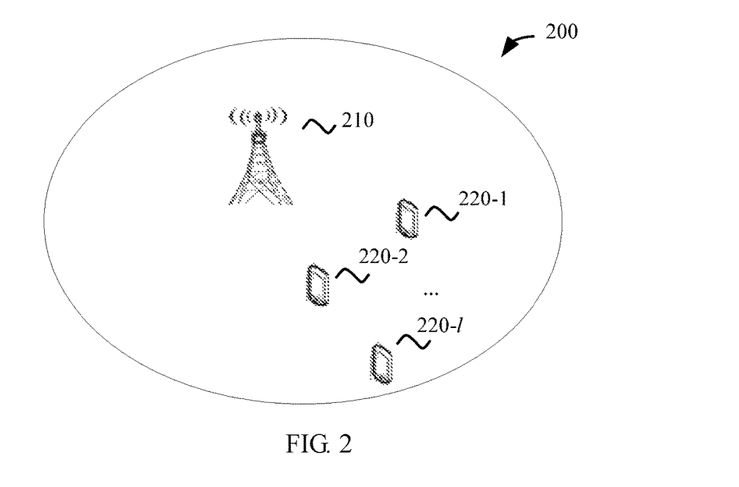
FIG. 2 is a schematic diagram of a communications system according to an embodiment of the present invention.

FIG. 2 is a schematic diagram of a communications system according to an embodiment of the present invention. As shown in FIG. 2, the communications system 200 includes a base station 210, and terminal devices 220-1, 220-2, . . . , and 220-l, where l is a positive integer.

A terminal device (TD) may be any one of the terminal devices 220-1, 220-2, . . . , or 220-l, and is also referred to as user equipment (UE) or may be referred to as a mobile terminal, mobile user equipment, or the like. The terminal device may communicate with one or more core networks by using the base station 210 and by using a radio access network (for example, RAN, Radio Access Network).

The terminal device 220-1, 220-2, . . . , or 220-l may be a mobile terminal such as a mobile phone (or referred to as a "cellular" phone), or a computer having a mobile terminal. For example, the terminal device may be a portable, pocket-sized, handheld, computer built-in or in-vehicle mobile apparatus, and exchanges voice and/or data with the radio access network.

The base station 210 may be a base transceiver station (BTS) in GSM or CDMA, or may be a NodeB in WCDMA, or may be an evolved NodeB (eNB or e-NodeB, evolutional Node B) in LTE. This is not limited in the embodiments of the present invention.

Figure 3:
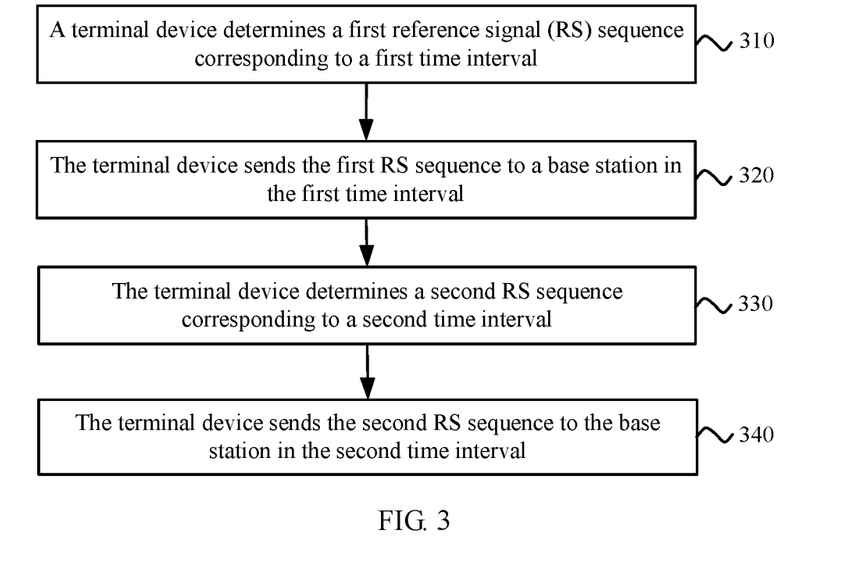
FIG. 3 is a schematic flowchart of a data transmission method according to an embodiment of the present invention.

FIG. 3 is a schematic flowchart of a data transmission method according to an embodiment of the present invention. The method in FIG. 3 may be executed by a terminal device.

Step 310: The terminal device determines a first reference signal (RS) sequence corresponding to a first time interval, where the first RS sequence is one of N RS sequences, N is a positive integer, and the N RS sequences are generated based on at least two root sequences.

Optionally, the RS sequence may be a demodulation reference signal (DMRS) sequence, or may be another reference signal.

Optionally, the N RS sequences correspond to a same cell, and the cell is a current serving cell of the terminal device. For example, a base station of the cell may communicate with a plurality of terminal devices, and when all terminal devices in the cell need to send an RS sequence to the base station, all the terminal devices use an RS sequence in the N RS sequences.

Optionally, in an embodiment, the terminal device may directly receive the N RS sequences sent by the base station.

Optionally, in another embodiment, the terminal device may receive the at least two root sequences sent by the base station, and then generate the N RS sequences according to the at least two root sequences.

Optionally, a root sequence used for an uplink RS sequence is a Zadoff-Chu (ZC) sequence.

Optionally, each ZC sequence whose root is u may be calculated according to the following formula:

$$x_u(n) = e^{-j\frac{\pi u n(n+1)}{N_{ZC}}}, 0 \le n \le N_{ZC} - 1, \quad (1)$$

where $N_{ZC}$ is a sequence length, u is a sequence root, and u is a positive integer. $x_u(n)$ is an element, of the sequence, whose index is n. For example, $N_{ZC}=31$, and u=5. An element whose index is 0 is $x_u(0)=1$; an element whose index is 1 is $$x_u(1) = e^{-j\frac{5\pi(1+1)}{31}};$$

and so on.

It is assumed that the base station schedules X resource blocks (RB) for a user, to transmit a PUSCH, and one RB includes Y subcarriers. Therefore, one RS sequence occupies X*Y subcarriers, that is, a length of the RS sequence is X*Y.

When an RS sequence is calculated by using the formula (1), for the RS sequence with the length of X*Y, $N_{ZC}$ may be defined as a maximum prime less than X*Y. A ZC sequence with a length of $N_{ZC}$ may be calculated according to the formula (1), and then the RS sequence with the length of X*Y is obtained by cyclic extension.

Figure 4:
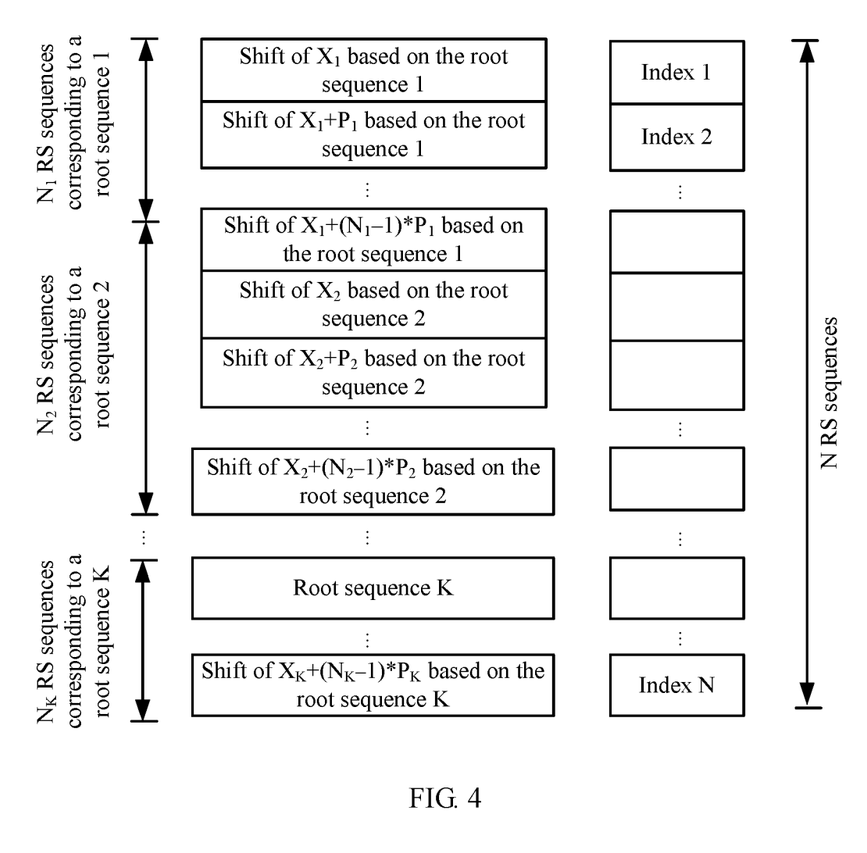
FIG. 4 is a schematic diagram of an RS sequence algorithm according to an embodiment of the present invention.

In an embodiment, a manner of generating N RS sequences by using at least two root sequences is shown in FIG. 4. $N_1$ RS sequences may be generated based on a root sequence 1 by means of a cyclic shift, where the first RS sequence is generated based on the root sequence 1 by shifting $X_1$, the second RS sequence is generated based on the root sequence 1 by means of a cyclic shift of $X_1+P_1$, . . . , and by analogy, an $N_1^{th}$ RS sequence is generated based on the root sequence 1 by means of a cyclic shift of $X_1+(N_1-1)*P_1$. $X_1$ is an integer greater than or equal to 0, and $P_1$ and $N_1$ are positive integers. Similarly, $N_2$ RS sequences may be generated based on a root sequence 2, where the first RS sequence is generated based on the root sequence 2 by means of a cyclic shift of $X_2$, the second RS sequence is generated based on the root sequence 2 by means of a cyclic shift of $X_2+P_2$, . . . , and by analogy, an $N_2^{th}$ RS sequence is generated based on the root sequence 2 by means of a cyclic shift of $X_2+N_2*P_2$. $X_2$ is an integer greater than or equal to 0, and $P_2$ and $N_2$ are positive integers. Likewise, if the N RS sequences are generated based on K root sequences, $N_k$ RS sequences may be generated based on a root sequence K. The first RS sequence is generated based on the root sequence K by means of a cyclic shift of $X_K$, the second RS sequence is generated based on the root sequence K by means of a cyclic shift of $X_K+P_K$, . . . , and by analogy, an $N_2^{th}$ RS sequence is generated based on the root sequence 2 by means of a cyclic shift of $X_K+N_K*P_K$. $X_K$ is an integer greater than or equal to 0, K, $P_K$, and $N_K$ are positive integers, and N is a sum of $N_1$, $N_2$, . . . , and $N_k$.

It should be noted that, in this embodiment of the present invention, a cyclic shift for a sequence means sequentially shifting elements in the sequence left or right. When an element is shifted to an end, repeated cycling is performed. For example, if a sequence is {1, 2, 3, 4}, a sequence {3, 4, 1, 2} may be obtained based on the sequence by means of a cyclic shift of 2; and so on.

Optionally, the N RS sequences correspond to N index numbers. As shown in FIG. 4, the N RS sequences may respectively correspond to index numbers 1 to N. It should be noted that, different from a shift for a root sequence, a shift of k for an index number means adding k to the index number, where k is a positive integer.

Therefore, the terminal device may obtain the N RS sequences that are generated based on the at least two root sequences, and each RS sequence corresponds to one index number. A plurality of root sequences are introduced, so that the following problem is resolved: Only a limited quantity of terminal devices can transmit data in a competitive data transmission area because each root sequence can correspond only to a limited quantity of RS sequences (for example, eight sequences).

Step 320: The terminal device sends the first RS sequence to a base station in the first time interval. The first time interval is further described in step 340.

Optionally, the obtaining, by the terminal device, a first RS sequence corresponding to a first time interval specifically includes: receiving, by the terminal device, higher layer signaling sent by the base station. The higher layer signaling indicates the first RS sequence to the terminal device.

In addition, optionally, the obtaining, by the terminal device, a first RS sequence corresponding to a first time interval specifically includes: calculating, by the terminal device according to the following predefined formula (2), a first index number corresponding to the first RS sequence, and obtaining the first RS sequence according to the first index number:

$$RS_{index1} = C_{RNTI} \bmod N \qquad (2),\text{ where}$$

$RS_{index}$ is the first index number, $C_{RNTI}$ is a cell radio network temporary identifier of the terminal device, and N is a sequence quantity of the N RS sequences.

Optionally, the terminal device sends a first data packet to the base station in the first time interval by using the first RS sequence.

As described above, a plurality of root sequences are introduced, so that the following problem is resolved: Only a limited quantity of terminal devices can transmit data in a competitive data transmission area.

However, because each of the at least two root sequences may be a ZC sequence, every two of RS sequences that are generated based on each root sequence are orthogonal. However, RS sequences that are generated based on different root sequences may be non-orthogonal. Because non-orthogonal RSs are introduced, and a plurality of terminal devices corresponding to one base station select reference signals from the N RS sequences, there may be a relatively strong correlation between RS sequences used by two terminal devices. This causes a detection error of the base station.

For example, it is assumed that when a terminal device sends a first data packet to the base station in a first time interval by using a first RS sequence, another terminal device sends a data packet in the same time interval by using another RS sequence. If the first RS sequence has a relatively strong correlation with the RS sequence used by the another terminal device, the terminal device receives, from the base station, an instruction for retransmitting the first data packet.

If the two terminal devices still use the previous two RSs with a relatively strong correlation during retransmission, and data packet retransmission is still performed in a same time interval, interference is also relatively large. To avoid the foregoing problem, RSs for initial transmission and retransmission may be different, so that interference caused by the RSs is randomized.

Step 330: The terminal device determines a second RS sequence corresponding to a second time interval, where the second RS sequence is also one of the N RS sequences, and the second RS sequence is calculated according to the first RS sequence.

Step 340: The terminal device sends the second RS sequence to the base station in the second time interval.

In this embodiment of the present invention, there are two different definitions for the first time interval and the second time interval. The following separately describes Case 1 and Case 2.

Case 1: The first time interval and the second time interval respectively correspond to a unit time domain resource for sending a data packet and another unit time domain resource for retransmitting the data packet.

In this embodiment of the present invention, retransmitting a data packet means performing channel coding and rate matching on original data of the data packet to obtain retransmitted data obtained after the original data is encoded, and sending the retransmitted data.

Optionally, the unit time domain resource may be one subframe.

In this case, the terminal device sends the first data packet to the base station in the first time interval by using the first RS sequence; and the terminal device retransmits the first data packet to the base station in the second time interval by using the second RS sequence. The second RS sequence is different from the first RS sequence.

Optionally, that the second RS sequence is calculated according to the first RS sequence specifically includes: the terminal device calculates, according to the index number of the first sequence and a shift count of index numbers of two adjacent time intervals in which the terminal device sends a same data packet, a second index number corresponding to the second sequence.

Optionally, the terminal device may calculate, according to the first RS sequence and according to the following formula (3), the second index number corresponding to the second RS sequence:

$$RS_{index2} = (RS_{index1} + S_1) \bmod T \quad (3), \text{where}$$

$RS_{index2}$ is the second index number corresponding to the second sequence, $RS_{index1}$ is the first index number corresponding to the first sequence, $S_1$ is the shift count of the index numbers of the two adjacent time intervals in which the terminal device sends a same data packet, $S_1$ is a positive integer, and $T$ is a minimal prime greater than or equal to $N$.

Because T is a prime, any positive integer and T are coprime. Therefore, it is ensured that the terminal device can configure all the N RS sequences after time intervals in which the data packet is sent for N times.

Optionally, the terminal device configures, for each data packet, a different RS sequence for a time interval in which the data packet is sent each time. Therefore, a time interval in which a same data packet is sent for an $(n+1)^{th}$ time is adjacent to a time interval in which the same data packet is sent for an $n^{th}$ time. It should be noted that, for a data packet, $(n+1)^{th}$ sending may also be referred to as retransmission of $n^{th}$ sending, where n is a positive integer.

As described above, $S_1$ is the shift count of the two adjacent time intervals of the terminal device. Because $S_1$ is a positive integer, it is ensured that the second index number $RS_{index2}$ and the first index number $RS_{index1}$ are different values. In addition, because the RS sequences are in a one-to-one correspondence with the index numbers, the second RS sequence is different from the first RS sequence, so that it is ensured that when a same data packet is sent again, an RS sequence different from a previous RS sequence is used.

Optionally, in another embodiment, the terminal device may calculate, according to the first RS sequence and according to the following formula (4), the second index number corresponding to the second RS sequence:

$$RS_{index2} = (RS_{index1} + M_1) \bmod N \quad (4), \text{where}$$

$RS_{index2}$ is the second index number corresponding to the second sequence, $RS_{index1}$ is the first index number corresponding to the first sequence, $M_1$ is the shift count of the index numbers of the two adjacent time intervals in which the terminal device sends a same data packet, $M_1$ is a positive integer, and $M_1$ and N are coprime.

Therefore, it is ensured that the terminal device can configure all the N RSs after the time intervals in which the data packet is sent for N times.

For example, the terminal device adds $M_1$ to the first index number, and performs a modulo operation on N to obtain the second index number, so as to obtain the second RS sequence. M and N are coprime. Therefore, each time M is added to an index number, it can be ensured that after N time intervals, the terminal device can configure all of the N RS sequences, and an RS sequence used each time is different. For example, assuming that a quantity N of RS sequences is 8, any one of 1, 3, 5, or 7 may be selected as M. When M is 1, in each time interval, an index number corresponding to an RS sequence configured by the terminal device is a previous index number plus 1. After eight time intervals, the terminal device can configure all the eight RS sequences.

In conclusion, the terminal device configures a different RS sequence for a time interval in which a data packet is sent each time, so that a different RS sequence can be used for each time of sending the data packet, and interference caused by RSs is randomized.

Case 2: The first time interval and the second time interval respectively correspond to two unit time domain resources, for example, subframes, on which the base station allows the terminal device to send a data packet. The terminal device may receive information, sent by the base station, about a plurality of unit time domain resources on which the terminal device is allowed to send a data packet. The first time interval is one of the plurality of unit time domain resources, and the second time interval is also one of the plurality of unit time domain resources and is a $K^{th}$ unit time domain resource after the first time interval, where K is a positive integer greater than 1. That is, between the first time interval and the second time interval, there is further information about K−1 unit time domain resources on which the terminal device is allowed to send a data packet. In each unit time domain resource on which sending of a data packet is allowed, the terminal device may or may not send a data packet.

For example, the unit time domain resource is a subframe, that is, the first time interval corresponds to a subframe that can be used to send a data packet, and the second time interval corresponds to a $K^{th}$ subframe that can be used to send a data packet after the first time interval. Optionally, the terminal device may configure one corresponding RS sequence for each subframe that can be used to send a data packet. Although the terminal device does not send a data packet in the second to $(K-1)^{th}$ subframes, the terminal device still configures the corresponding RS sequence for each subframe according to a configuration rule. A calculation manner for an RS sequence of the $K^{th}$ subframe is described subsequently.

Optionally, the N RS sequences correspond to N different time intervals, each time interval is a unit time domain resource on which the UE is allowed to send a data packet to the base station, and one time cycle includes the N time intervals. The first time interval is the first unit time domain resource in the time cycle.

Optionally, that the second RS sequence is calculated according to the first RS sequence specifically includes: the terminal device calculates, according to the index number of the first sequence and a shift count of index numbers corresponding to two adjacent unit time domain resources, a second index number corresponding to the second sequence.

Optionally, the terminal device calculates, according to the following formula (5), the second index number corresponding to the second sequence:

$$RS_{index2}=[RS_{index1}+(K-1)S_2] \bmod T \quad (5),\text{ where}$$

$RS_{index2}$ is the second index number corresponding to the second sequence, $RS_{index1}$ is the first index number corresponding to the first sequence, $S_2$ is the shift count of the index numbers corresponding to the two adjacent unit time domain resources, and T is a minimal prime greater than or equal to N.

That is, because a second time corresponding to the second RS sequence is the $K^{th}$ subframe, a sequence index number of the RS sequence corresponding to the $K^{th}$ subframe needs to be calculated.

In addition, optionally, the terminal device may calculate, according to the first RS sequence and according to the following formula (6), the second index number corresponding to the second RS sequence:

$$RS_{index2}=[RS_{index1}+(K-1)M_2] \bmod N \quad (6),\text{ where}$$

$RS_{index2}$ is the second index number corresponding to the second sequence, $RS_{index1}$ is the first index number corresponding to the first sequence, $M_2$ is the shift count of the index numbers corresponding to the two adjacent unit time domain resources, $M_2$ is a positive integer, and $M_2$ and N are coprime.

Likewise, an RS sequence corresponding to any subframe may be calculated according to the formula (5) or the formula (6), regardless of whether the terminal device sends a data packet in the subframe.

In this case, because the terminal device may use a different RS sequence for sending in each subframe, an RS sequence also randomly changes, so that a probability of reference signal interference from or to another terminal device is reduced.

As described above, the N RS sequences may correspond to the N index numbers. The terminal device may obtain a corresponding RS sequence according to an index number.

In conclusion, the terminal device configures a different RS sequence for a time interval in which sending of data is allowed each time, so that RS sequences are greatly decreased, and interference caused by the RSs is randomized.

Figure 5:
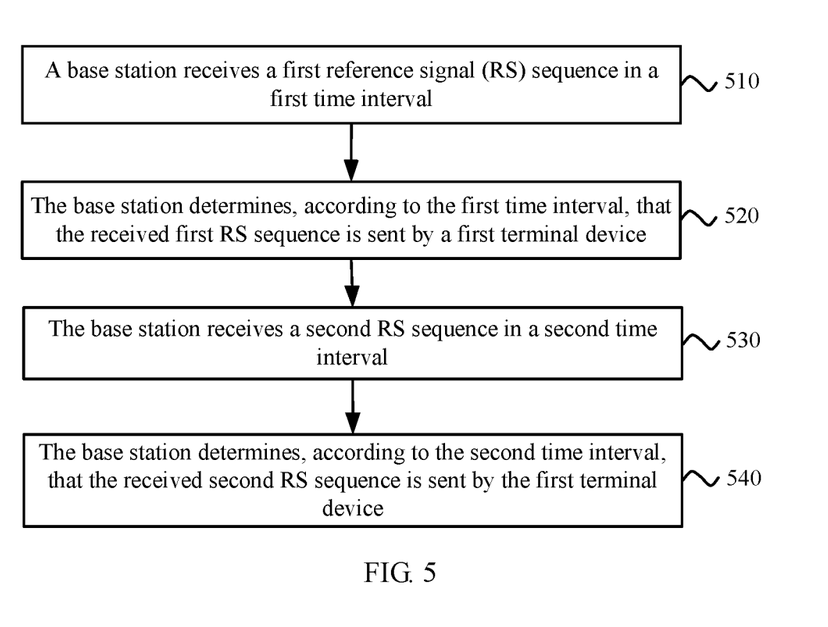
FIG. 5 is a schematic flowchart of a data transmission method according to another embodiment of the present invention.

FIG. 5 is a schematic flowchart of a data transmission method according to an embodiment of the present invention. The method in FIG. 5 may be executed by a base station.

Step 510: The base station receives a first reference signal (RS) sequence in a first time interval, where the first RS sequence is one of N RS sequences, N is a positive integer, and the N RS sequences are generated based on at least two root sequences.

Optionally, the N RS sequences correspond to a same cell, and the cell is a cell corresponding to the base station. The N RS sequences are already described in step 310, and details are not described herein again.

Step 520: The base station determines, according to the first time interval, that the received first RS sequence is sent by a first terminal device.

Step 530: The base station receives a second RS sequence in a second time interval, where the second RS sequence is one of the N RS sequences, and the second RS sequence is determined according to the first RS sequence.

Optionally, in Case 1, the first time interval and the second time interval respectively correspond to a unit time domain resource for sending a data packet and another unit time domain resource for retransmitting the data packet.

Optionally, the base station receives, in the first time interval, a first data packet that is sent by the terminal device by using the first RS sequence; and the base station receives, in the second time interval, the first data packet that is sent again by the terminal device by using the second RS sequence. The second RS sequence is different from the first RS sequence.

Optionally, the N RS sequences are in a one-to-one correspondence with N index numbers, and the determining the second RS sequence according to the first RS sequence includes: calculating, according to an index number of the first RS sequence and a shift count of index numbers of two adjacent time intervals in which a same data packet is sent, a second index number corresponding to the second RS sequence.

Optionally, a formula for calculating the second index number is the formula (3). $RS_{index2}$ is the second index number corresponding to the second sequence, $RS_{index1}$ is the first index number corresponding to the first sequence, $S_1$ is the shift count of the index numbers of the two adjacent time intervals in which the base station receives a same data packet, $S_1$ is a positive integer, and T is a minimal prime greater than or equal to N.

Optionally, a formula for calculating the second index number is the formula (4). $RS_{index2}$ is the second index number corresponding to the second sequence, $RS_{index1}$ is the first index number corresponding to the first sequence, $M_1$ is the shift count of the index numbers of the two adjacent time intervals in which the base station receives a same data packet, $M_1$ is a positive integer, and $M_1$ and N are coprime.

Case 2: The first time interval and the second time interval respectively correspond to two unit time domain resources, for example, subframes, on which the base station allows the terminal device to send a data packet.

Optionally, the N RS sequences correspond to N different time intervals, each time interval is a unit time domain resource on which the base station allows the terminal device to send a data packet, and one time cycle includes the N time intervals. The first time interval is the first unit time domain resource in the time cycle, the second time interval is a $K^{th}$ unit time domain resource in the time cycle, and K is a positive integer greater than 1 and less than or equal to N.

Optionally, the N RS sequences are in a one-to-one correspondence with N index numbers, and the determining the second RS sequence according to the first RS sequence includes: calculating, according to an index number of the first RS sequence and a shift count of index numbers corresponding to two adjacent unit time domain resources, a second index number corresponding to the second RS sequence.

Optionally, the formula for calculating the second index number is the formula (5). $RS_{index2}$ is the second index number corresponding to the second RS sequence, $RS_{index1}$ is the first index number corresponding to the first RS sequence, $S_2$ is the shift count of the index numbers corresponding to the two adjacent unit time domain resources, and T is a minimal prime greater than or equal to N.

Optionally, the formula for calculating the second index number is the formula (6). $RS_{index2}$ is the second index number corresponding to the second sequence, $RS_{index1}$ is the first index number corresponding to the first sequence, $S_2$ is the shift count of the index numbers corresponding to the two adjacent unit time domain resources, $M_1$ is a positive integer, and $M_2$ and N are coprime.

Optionally, the base station sends higher layer signaling to the terminal device, and the higher layer signaling indicates the first RS sequence to the terminal device.

Optionally, each of the at least two root sequences is a Zadoff-Chu sequence.

Step 540: The base station determines, according to the second time interval, that the received second RS sequence is sent by the first terminal device.

For a process of performing data transmission by the base station, refer to the method executed by the terminal device in FIG. 3. Details are not described herein again.

Figure 6:
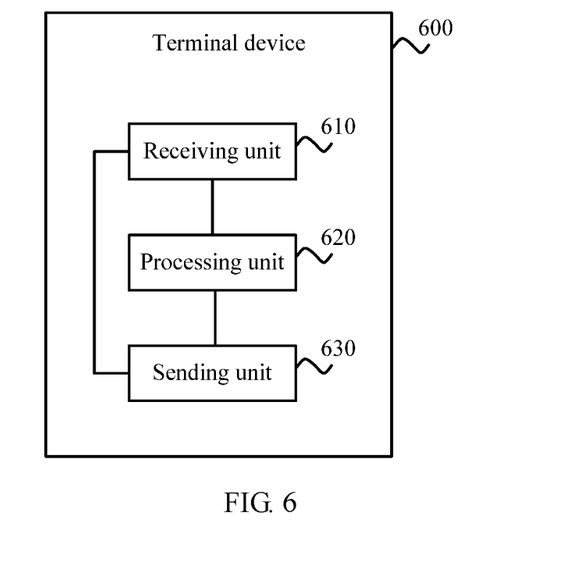
FIG. 6 is a schematic structural diagram of a terminal device according to an embodiment of the present invention.

FIG. 6 is a schematic diagram of a terminal device according to an embodiment of the present invention. User equipment 600 in FIG. 6 includes a receiving unit 610, a processing unit 620, and a sending unit 630.

The processing unit 620 is configured to determine a first reference signal (RS) sequence corresponding to a first time interval, where the first RS sequence is one of N RS sequences, N is a positive integer greater than 1, and the N RS sequences are generated based on at least two root sequences.

The sending unit 630 is configured to send the first RS sequence to a base station in the first time interval.

The processing unit 620 is further configured to determine, from the N RS sequences according to the first RS sequence, one RS sequence as a second RS sequence corresponding to a second time interval, where the second RS sequence is determined according to the first RS sequence. The sending unit 630 is further configured to send the second RS sequence to the base station in the second time interval.

Optionally, the N RS sequences correspond to a same cell, and the cell is a current serving cell of the terminal device.

The first time interval and the second time interval respectively correspond to a unit time domain resource for sending a data packet and another unit time domain resource for retransmitting the data packet.

Optionally, the sending unit 630 sends a first data packet to the base station in the first time interval by using the first RS sequence; and the sending unit 630 sends the first data packet to the base station again in the second time interval by using the second RS sequence. The second RS sequence is different from the first RS sequence.

Optionally, the N RS sequences are in a one-to-one correspondence with N index numbers, and that the processing unit 620 determines the second RS sequence according to the first RS sequence includes: the processing unit 620 calculates, according to an index number of the first RS sequence and a shift count of index numbers of two adjacent time intervals in which a same data packet is sent, a second index number corresponding to the second RS sequence; and the processing unit 620 determines the second RS sequence according to the second index number.

Optionally, a formula for calculating the second index number is the formula (3). $RS_{index2}$ is the second index number corresponding to the second sequence, $RS_{index1}$ is the first index number corresponding to the first sequence, $S_1$ is the shift count of the index numbers of the two adjacent time intervals in which the sending unit 630 sends a same data packet, $S_1$ is a positive integer, and T is a minimal prime greater than or equal to N.

Optionally, a formula for calculating the second index number is the formula (4). $RS_{index2}$ is the second index number corresponding to the second sequence, $RS_{index1}$ is the first index number corresponding to the first sequence, $M_1$ is the shift count of the index numbers of the two adjacent time intervals in which the sending unit 630 sends a same data packet, $M_1$ is a positive integer, and $M_1$ and N are coprime.

Case 2: The first time interval and the second time interval respectively correspond to two unit time domain resources, for example, subframes, on which the base station allows the terminal device to send a data packet.

Optionally, the N RS sequences correspond to N different time intervals, each time interval is a unit time domain resource on which the terminal device is allowed to send a data packet to the base station, and one time cycle includes the N time intervals. The first time interval is the first unit time domain resource in the time cycle, the second time interval is a $K^{th}$ unit time domain resource in the time cycle, and K is a positive integer greater than 1 and less than or equal to N.

Optionally, the N RS sequences are in a one-to-one correspondence with N index numbers, and that the processing unit 620 determines the second RS sequence according to the first RS sequence includes: the processing unit 620 calculates, according to an index number of the first RS sequence and a shift count of index numbers corresponding to two adjacent unit time domain resources, a second index number corresponding to the second RS sequence.

Optionally, a formula for calculating the second index number is the formula (5). $RS_{index2}$ is the second index number corresponding to the second RS sequence, $RS_{index1}$ is the first index number corresponding to the first RS sequence, $S_2$ is the shift count of the index numbers corresponding to the two adjacent unit time domain resources, and T is a minimal prime greater than or equal to N.

Optionally, the processing unit 620 calculates the second index number according to the formula (6). $RS_{index2}$ is the second index number corresponding to the second sequence, $RS_{index1}$ is the first index number corresponding to the first sequence, $S_2$ is the shift count of the index numbers corresponding to the two adjacent unit time domain resources, $M_2$ is a positive integer, and $M_2$ and N are coprime.

Optionally, the terminal device further includes the receiving unit 610. That the processing unit 620 determines a first RS sequence corresponding to a first time interval includes: the receiving unit 610 determines the first RS sequence according to higher layer signaling received from the base station, where the higher layer signaling indicates the first RS sequence to the terminal device.

Optionally, that the processing unit 620 determines a first RS sequence corresponding to a first time interval includes: the processing unit 620 calculates, according to the following predefined formula (2), the first index number corresponding to the first RS sequence, and obtains the first RS sequence according to the first index number.

For a process of performing data transmission by the terminal device in FIG. 6, refer to the method executed by the terminal device in FIG. 3. Details are not described herein again.

Figure 7:
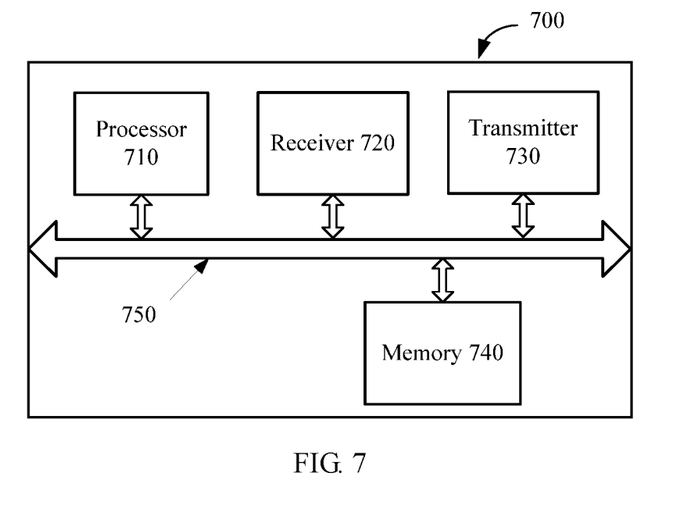
FIG. 7 is a schematic structural diagram of a terminal device according to another embodiment of the present invention.

It should be noted that, in this embodiment of the present invention, the receiving unit 610 may be implemented by a receiver, the sending unit 630 may be implemented by a transmitter, and the processing unit 620 may be implemented by a processor. As shown in FIG. 7, user equipment 700 may include a processor 710, a receiver 720, a transmitter 730, and a memory 740. The memory 740 may be configured to store a program/code pre-installed at delivery of a terminal device, or may store code executed by the processor 710, and the like.

Components in the user equipment 700 are coupled together by using a bus system 750. In addition to a data bus, the bus system 750 includes a power bus, a control bus, and a status signal bus.

Figure 8:
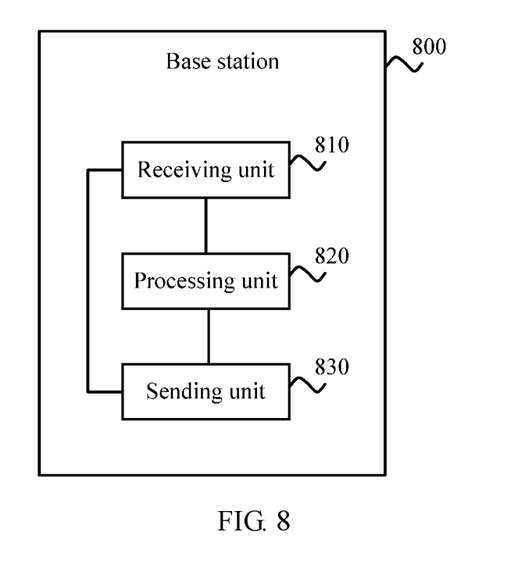
FIG. 8 is a schematic structural diagram of a base station according to an embodiment of the present invention.

FIG. 8 is a schematic diagram of a base station according to an embodiment of the present invention. Base station 800 in FIG. 8 includes a receiving unit 810, a processing unit 820, and a sending unit 830.

The receiving unit 810 is configured to receive a first reference signal (RS) sequence in a first time interval, where the first RS sequence is one of N RS sequences, N is a positive integer, and the N RS sequences are generated based on at least two root sequences.

The processing unit 820 is configured to determine, according to the first time interval, that the received first RS sequence is sent by a first terminal device.

The receiving unit 810 is further configured to receive a second RS sequence in a second time interval, where the second RS sequence is one of the N RS sequences, and the second RS sequence is determined according to the first RS sequence.

The processing unit 820 is further configured to determine, according to the second time interval, that the received second RS sequence is sent by the first terminal device.

Optionally, the N RS sequences correspond to a same cell, and the cell is a cell corresponding to the base station.

Case 1: The first time interval and the second time interval respectively correspond to a unit time domain resource for sending a data packet and another unit time domain resource for retransmitting the data packet.

Optionally, the receiving unit 810 is further configured to receive, in the first time interval, a first data packet that is sent by the terminal device by using the first RS sequence; and the receiving unit 810 is further configured to receive, in the second time interval, the first data packet that is sent again by the terminal device by using the second RS sequence. The second RS sequence is different from the first RS sequence.

Optionally, the N RS sequences are in a one-to-one correspondence with N index numbers, and the determining the second RS sequence according to the first RS sequence includes: calculating, according to an index number of the first RS sequence and a shift count of index numbers of two adjacent time intervals in which a same data packet is sent, a second index number corresponding to the second RS sequence.

Optionally, the formula for calculating the second index number is the formula (3). $RS_{index2}$ is the second index number corresponding to the second sequence, $RS_{index1}$ is the first index number corresponding to the first sequence, $S_1$ is the shift count of the index numbers of the two adjacent time intervals in which the receiving unit 810 receives a same data packet, $S_1$ is a positive integer, and T is a minimal prime greater than or equal to N.

Optionally, the formula for calculating the second index number is the formula (4). $RS_{index2}$ is the second index number corresponding to the second sequence, $RS_{index1}$ is the first index number corresponding to the first sequence, $M_1$ is the shift count of the index numbers of the two adjacent time intervals in which the receiving unit 810 receives a same data packet, $M_1$ is a positive integer, and $M_1$ and N are coprime.

Case 2: The first time interval and the second time interval respectively correspond to two unit time domain resources, for example, subframes, on which the base station allows the terminal device to send a data packet.

Optionally, the N RS sequences correspond to N different time intervals, each time interval is a unit time domain resource on which the base station allows the terminal device to send a data packet, and one time cycle includes the N time intervals. The first time interval is the first unit time domain resource in the time cycle, the second time interval is a $K^{th}$ unit time domain resource in the time cycle, and K is a positive integer greater than 1 and less than or equal to N.

Optionally, the N RS sequences are in a one-to-one correspondence with N index numbers, and the determining the second RS sequence according to the first RS sequence includes: calculating, according to an index number of the first RS sequence and a shift count of index numbers corresponding to two adjacent unit time domain resources, a second index number corresponding to the second RS sequence.

Optionally, the formula for calculating the second index number is the formula (5). $RS_{index2}$ is the second index number corresponding to the second RS sequence, $RD_{index1}$ is the first index number corresponding to the first RS sequence, $S_2$ is the shift count of the index numbers corresponding to the two adjacent unit time domain resources, and T is a minimal prime greater than or equal to N.

Optionally, the formula for calculating the second index number is the formula (6). $RS_{index2}$ is the second index number corresponding to the second sequence, $RS_{index1}$ is the first index number corresponding to the first sequence, $S_2$ is the shift count of the index numbers corresponding to the two adjacent unit time domain resources, $M_1$ is a positive integer, and $M_2$ and N are coprime.

Optionally, the sending unit 830 sends higher layer signaling to the terminal device, and the higher layer signaling indicates the first RS sequence to the terminal device.

For a process of performing data transmission by the base station, refer to the data transmission method executed by the terminal device in FIG. 3 and the data transmission method executed by the base station in FIG. 5. Details are not described herein again.

Figure 9:
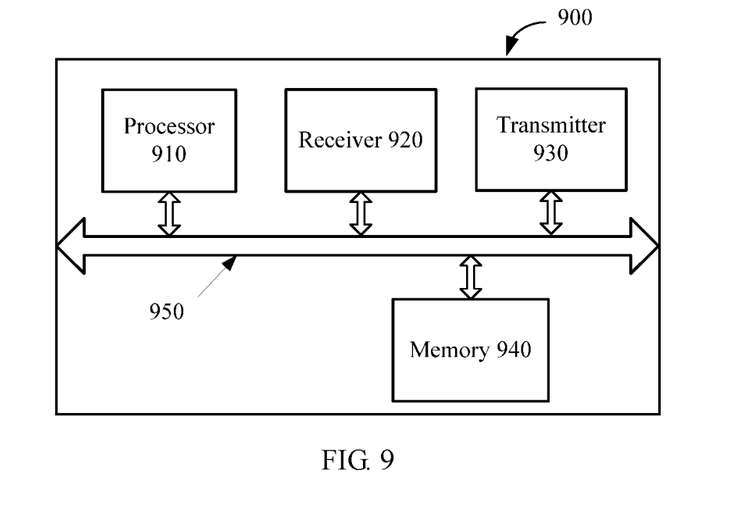
FIG. 9 is a schematic structural diagram of a base station according to another embodiment of the present invention.

It should be noted that, in this embodiment of the present invention, the receiving unit 810 may be implemented by a receiver, the sending unit 830 may be implemented by a transmitter, and the processing unit 820 may be implemented by a processor. As shown in FIG. 9, a base station 900 may include a processor 910, a receiver 920, a transmitter 930, and a memory 940. The memory 940 may be used as a program/code pre-installed for the base station, or may store code executed by the processor 910, and the like.

Components in the base station 900 are coupled together by using a bus system 950. In addition to a data bus, the bus system 950 includes a power bus, a control bus, and a status signal bus.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware, software, or a combination depends on particular applications and designed constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The computer software product is stored in a storage medium, and includes several instructions used to instruct a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only memory), a random access memory (RAM, Random Access Memory), a magnetic disk, or an optical disc.

The foregoing descriptions are merely specific implementations of embodiments of the present invention, but are not intended to limit the protection scope of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A data transmission method, comprising:
   determining, by a terminal device, a first reference signal (RS) sequence corresponding to a first time interval, wherein the first RS sequence is one of N RS sequences, N is a positive integer greater than 1, the N RS sequences are generated based on at least two root sequences, and the N RS sequences correspond to N index numbers;
   sending, by the terminal device, the first RS sequence to a base station in the first time interval;
   determining, by the terminal device from the N RS sequences according to the first RS sequence, one RS sequence as a second RS sequence corresponding to a second time interval, wherein the second RS sequence is determined according to a second index number of the second RS sequence determined by a shift from a first index number of the first RS sequence; and
   sending, by the terminal device, the second RS sequence to the base station in the second time interval.

2. The method according to claim 1, wherein the N RS sequences correspond to a same cell, and the same cell is a current serving cell of the terminal device.

3. The method according to claim 1, further comprising:
   sending, by the terminal device, a first data packet to the base station in the first time interval using the first RS sequence; and
   sending, by the terminal device, the first data packet to the base station in the second time interval using the second RS sequence, wherein the second RS sequence is different from the first RS sequence.

4. The method according to claim 3, wherein the N RS sequences are in a one-to-one correspondence with the N index numbers, and the determining, by the terminal device according to the first RS sequence, one RS sequence from the N RS sequences as a second RS sequence corresponding to a second time interval comprises:
   calculating, by the terminal device according to the first index number of the first RS sequence and a shift count of index numbers of two adjacent time intervals in which a same data packet is sent, the second index number corresponding to the second RS sequence; and
   determining, by the terminal device, the second RS sequence according to the second index number.

5. The method according to claim 4, wherein a formula for calculating the second index number is:

$$RS_{index2} = (RS_{index1} + S_1) \mod T, \text{ wherein}$$

$RS_{index2}$ is the second index number corresponding to the second RS sequence, $RS_{index1}$ is the first index number corresponding to the first RS sequence, $S_1$ is the shift count of the index numbers of the two adjacent time intervals in which the terminal device sends a same data packet, $S_1$ is a positive integer, and T is a minimal prime greater than or equal to N.

6. A data transmission method, comprising:
   receiving, by a base station, a first reference signal (RS) sequence in a first time interval, wherein the first RS sequence is one of N RS sequences, N is a positive integer, the N RS sequences are generated based on at least two root sequences, and the N RS sequences correspond to N index numbers;
   determining, by the base station according to the first time interval, that the received first RS sequence is sent by a first terminal device;
   receiving, by the base station, a second RS sequence in a second time interval, wherein the second RS sequence is one of the N RS sequences, and the second RS sequence is determined according to a second index number of the second RS sequence determined by a shift from a first index number of the first RS sequence; and determining, by the base station according to the second time interval, that the received second RS sequence is sent by the first terminal device.

7. The method according to claim 6, wherein the N RS sequences correspond to a same cell, and the same cell is a cell corresponding to the base station.

8. The method according to claim 6, further comprising:
receiving, by the base station in the first time interval, a first data packet that is sent by the terminal device using the first RS sequence; and
receiving, by the base station in the second time interval, the first data packet that is sent by the terminal device using the second RS sequence, wherein the second RS sequence is different from the first RS sequence.

9. The method according to claim 8, wherein the N RS sequences are in a one-to-one correspondence with the N index numbers, and the second RS sequence is determined according to the first RS sequence comprises:
calculating, according to the first index number of the first RS sequence and a shift count of index numbers of two adjacent time intervals in which a same data packet is received, the second index number corresponding to the second RS sequence.

10. The method according to claim 9, wherein the formula for calculating the second index number is:

$$RS_{index2} = (RS_{index1} + S_1) \bmod T, \text{ wherein}$$

$RS_{index2}$ is the second index number corresponding to the second RS sequence, $RS_{index1}$ is the first index number corresponding to the first RS sequence, $S_1$ is the shift count of the index numbers of the two adjacent time intervals in which the base station receives a same data packet, $S_1$ is a positive integer, and T is a minimal prime greater than or equal to N.

11. A terminal device, comprising:
a processor, configured to determine a first reference signal (RS) sequence corresponding to a first time interval, wherein the first RS sequence is one of N RS sequences, N is a positive integer greater than 1, the N RS sequences are generated based on at least two root sequences, and the N RS sequences correspond to N index numbers; and
a transmitter, configured to send the first RS sequence to a base station in the first time interval, wherein
the processor is further configured to determine, from the N RS sequences according to the first RS sequence, one RS sequence as a second RS sequence corresponding to a second time interval, wherein the second RS sequence is determined according to a second index number of the second RS sequence determined by a shift from a first index number of the first RS sequence; and
the transmitter is further configured to send the second RS sequence to the base station in the second time interval.

12. The terminal device according to claim 11, wherein the N RS sequences correspond to a same cell, and the same cell is a current serving cell of the terminal device.

13. The terminal device according to claim 11, wherein the transmitter sends a first data packet to the base station in the first time interval using the first RS sequence; and
the transmitter sends the first data packet to the base station in the second time interval using the second RS sequence, wherein the second RS sequence is different from the first RS sequence.

14. The terminal device according to claim 13, wherein the N RS sequences are in a one-to-one correspondence with the N index numbers, and that the processor determines the second RS sequence according to the first RS sequence comprises:
the processor calculates, according to the first index number of the first RS sequence and a shift count of index numbers of two adjacent time intervals in which a same data packet is sent, the second index number corresponding to the second RS sequence; and
the processor determines the second RS sequence according to the second index number.

15. The terminal device according to claim 14, wherein a formula for calculating the second index number is:

$$RS_{index2} = (RS_{index1} + S_1) \bmod T, \text{ wherein}$$

$RS_{index2}$ is the second index number corresponding to the second RS sequence, $RS_{index1}$ is the first index number corresponding to the first RS sequence, $S_1$ is the shift count of the index numbers of the two adjacent time intervals in which the transmitter sends a same data packet, $S_1$ is a positive integer, and T is a minimal prime greater than or equal to N.

16. A base station, comprising:
a receiver, configured to receive a first reference signal (RS) sequence in a first time interval, wherein the first RS sequence is one of N RS sequences, N is a positive integer, the N RS sequences are generated based on at least two root sequences, and the N RS sequences correspond to N index numbers; and
a processor, configured to determine, according to the first time interval, that the received first RS sequence is sent by a first terminal device, wherein
the receiver is further configured to receive a second RS sequence in a second time interval, wherein the second RS sequence is one of the N RS sequences, and the second RS sequence is determined according to a second index number of the second RS sequence determined by a shift from a first index number of the first RS sequence; and
the processor is further configured to determine, according to the second time interval, that the received second RS sequence is sent by the first terminal device.

17. The base station according to claim 16, wherein the N RS sequences correspond to a same cell, and the same cell is a cell corresponding to the base station.

18. The base station according to claim 16, wherein
the receiver is further configured to receive, in the first time interval, a first data packet that is sent by the terminal device using the first RS sequence; and
the receiver is further configured to receive, in the second time interval, the first data packet that is sent by the terminal device using the second RS sequence, wherein the second RS sequence is different from the first RS sequence.

19. The base station according to claim 18, wherein the N RS sequences are in a one-to-one correspondence with the N index numbers, and the determining the second RS sequence according to the first RS sequence comprises:
calculating, according to the first index number of the first RS sequence and a shift count of index numbers of two adjacent time intervals in which a same data packet is sent, the second index number corresponding to the second RS sequence.

20. The base station according to claim 19, wherein the formula for calculating the second index number is:

$RS_{index2} = (RS_{index1} + S_1) \bmod T$, wherein $RS_{index2}$ is the second index number corresponding to the second RS sequence, $RS_{index1}$ is the first index number corresponding to the first sequence, $S_1$ is the shift count of the index numbers of the two adjacent time intervals in which the receiver receives a same data packet, $S_1$ is a positive integer, and T is a minimal prime greater than or equal to N.

* * * * *